United States Patent [19]

Heyraud

[11] Patent Number: 4,677,332
[45] Date of Patent: Jun. 30, 1987

[54] ELECTRIC MOTOR HAVING AUXILIARY PORTIONS DISTRIBUTED AT A PITCH WHICH IS AN ODD NUMBER SUB-MULTIPLE OF THE PITCH OF ACTIVE PORTIONS

[75] Inventor: Marc A. Heyraud, La Chaux-de-Fonds, Switzerland

[73] Assignee: Asgalium SA, Switzerland

[21] Appl. No.: 769,469

[22] Filed: Aug. 26, 1985

[30] Foreign Application Priority Data

Aug. 31, 1984 [CH] Switzerland .................. 4183/84

[51] Int. Cl.⁴ .................................... H02K 3/00
[52] U.S. Cl. .................................... 310/184; 310/208; 310/268; 310/DIG. 6
[58] Field of Search .............. 310/208, 156, 268, 171, 310/180, 184, 46, DIG. 6, 68 R, 71, 198, 202, 203, 206

[56] References Cited

U.S. PATENT DOCUMENTS

| | | | |
|---|---|---|---|
| 3,487,246 | 12/1969 | Long | 310/268 |
| 4,109,170 | 8/1978 | Fujita | 310/268 |
| 4,220,879 | 9/1980 | Hoshimi | 310/268 |
| 4,260,920 | 4/1981 | Nakamura | 310/156 |
| 4,319,152 | 3/1982 | van Gils | 310/268 |
| 4,361,776 | 11/1982 | Hayashi | 310/268 |
| 4,568,847 | 2/1986 | Schmider | 310/208 |

FOREIGN PATENT DOCUMENTS

| | | | |
|---|---|---|---|
| 1371795 | 8/1964 | France | 310/DIG. 6 |
| 302497 | 1/1929 | United Kingdom | 310/68 R |
| 2000646 | 1/1979 | United Kingdom | 310/68 R |

OTHER PUBLICATIONS

Lindner, "Ein elektronisch kommutierter Scheibenläufermotor", *Feinwerktechnik & Messtechnik*, 88 (1980) 4, 172.
Encyclopedia Americana, vol. 25, p. 199, 1968.

*Primary Examiner*—R. Skudy
*Attorney, Agent, or Firm*—Parkhurst & Oliff

[57] ABSTRACT

The winding of the motor comprises coils which may be formed by conductive paths deposited on the surface of an insulating substrate according to the printed circuit technique. Each turn of the coil comprises two active conductors extending radially, inside connections, and outside connections. The outside connections of the outer paths of the coil have a fret or meander shape, constituting three pairs of auxiliary conductor portions. Upon rotation of the rotor, these portions create in the winding induced voltages having a frequency three times the commutation frequency of the coils, the effect of which is to regularize the motor torque.

5 Claims, 6 Drawing Figures

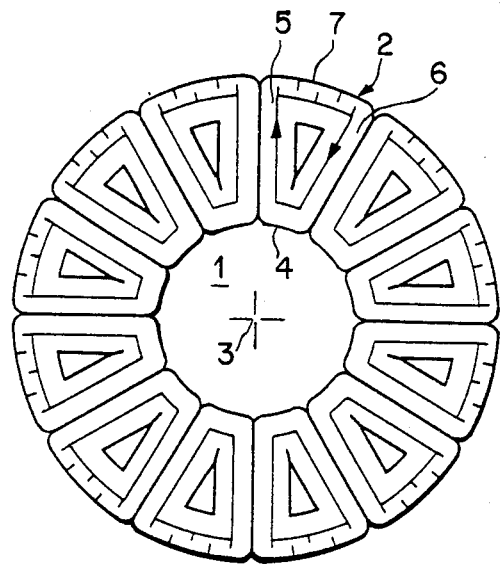
FIG. 1
FIG. 2
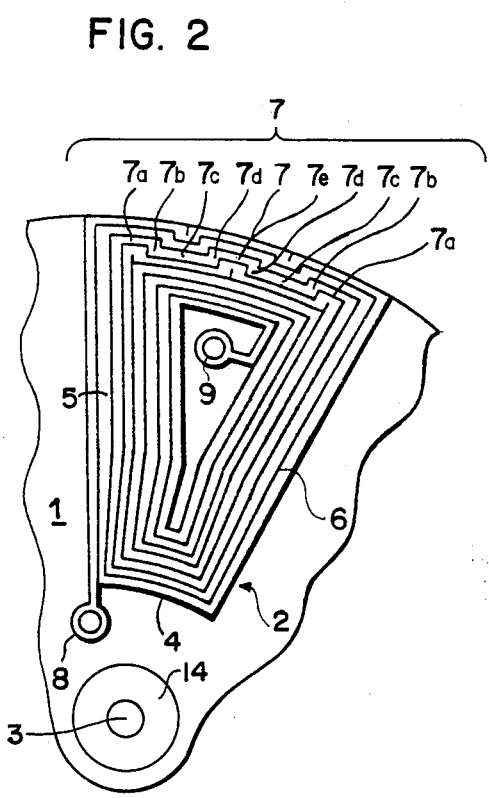
FIG. 3
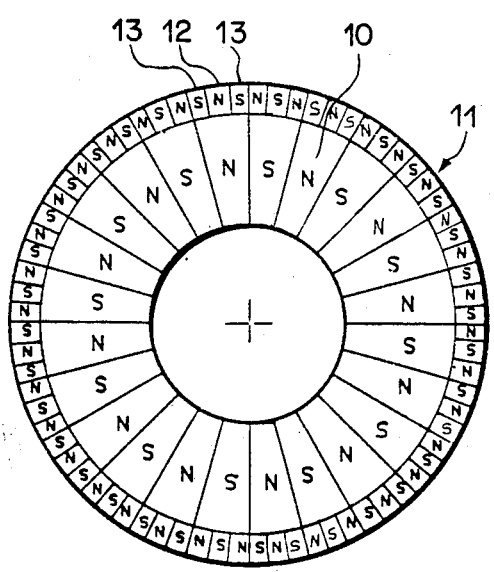

ELECTRIC MOTOR HAVING AUXILIARY PORTIONS DISTRIBUTED AT A PITCH WHICH IS AN ODD NUMBER SUB-MULTIPLE OF THE PITCH OF ACTIVE PORTIONS

BACKGROUND AND SUMMARY OF THE INVENTION

This invention relates to electric motors of the type having a fixed part, a part rotatable about an axis, a winding incorporated in one of these parts and including an assembly of active conductor portions distributed about the axis at a given pitch, and a feed device which is normally connected to a constant-voltage current source and controls, at a frequency corresponding to the pitch of the conductor portions, commutations of the connections between these portions and the poles of the current source.

In motors of this type, the feed device may be either a commutator, if the winding is incorporated in the movable part, or an electronic device if, on the contrary, the winding is incorporated in the fixed part. In both cases, the design of the feed device and of the winding assembly, as well as of the magnetic flux or fluxes must take into account that the motor torque varies periodically, the difference between its maximum and minimum values being proportional to $1 - \cos(\pi/2n)$, 2n being the number of commutations per pair of poles. In order to reduce the value of this difference, n may be increased, but this creates structural complications.

Another solution to this problem has been described in an article by J. Lindner which appeared in the journal *Feinwerktechnik und Messtechnik*, No. 88 (1980), p.4. This solution consists in eliminating the side portions of the coils.

Published U.K. Patent Application No. 2,000,646A describes a DC motor design in which the rotor comprises permanent magnets and the stator comprises fixed coils distributed about the axis. This likewise shows that the variation of the motor torque can be reduced during rotation by providing a dipole arrangement on certain angular zones of the rotor and giving the coils a polygonal outline. In this prior art design, however, the desired result is achieved at the cost of an incomplete filling of the coils and, consequently, a reduction in the power supplied.

It is an object of this invention to provide an improved electric motor arranged to reduce considerably the undulation of the torque without increasing the number of commutator segments and without limiting the filling of the coils, based upon the fact that a curve which is sinusoidal or is formed of portions of sinusoids can be "flattened" by adding to the mathematical experssion of the curve terms representing undulations having a shorter period than that of the basic sine curve, such periods being odd-number sub-multiples of the basic period. In other words, the shorter period is a fraction of the basic period determined by dividing the basic period by the odd-number.

To this end, in the electric motor according to the present invention, of the type initially mentioned, the winding comprises, besides the active conductor portions, auxiliary portions formed of sections of conductors disposed in series with active conductors and having an orientation relative to an axis of rotation similar to that of the active conductors with which they are in series, the auxiliary portions being distributed at a pitch which is an odd-number sub-multiple of the pitch of the portions of active conductors. In other words, the angular pitch of the auxiliary portions is a fraction of the angular pitch of the active conductor portions determined by dividing the angular pitch of the active conductors by the odd-number.

The effect of this arrangement is that upon rotation of the motor, an induced voltage is produced in the auxiliary portions, the frequency of which is a multiple of the voltage induced in the normal part of the winding, this multiple being an odd number equal to the above-mentioned sub-multiple.

In one preferred embodiment, in which the winding is incorporated in the part of the motor which is rotatable and is formed of flat coils distributed in the shape of a disk, a portion of each coil situated toward the coil heads forms a fret or meander which, when there are three pairs of auxiliary portions, occupies a sector of 120 electrical degrees.

BRIEF DESCRIPTION OF THE DRAWINGS

Preferred embodiments of the invention will now be described in detail with reference to the accompanying drawings, in which:

FIG. 1 is a plan view of the winding of a motor according to the invention,

FIG. 2 is a detail of a coil,

FIG. 3 is a view of the magnet assembly constituting the rotor of the motor,

DETAILED DESCRIPTION OF THE PREFERRED EMBODIMENT

Figure 4:
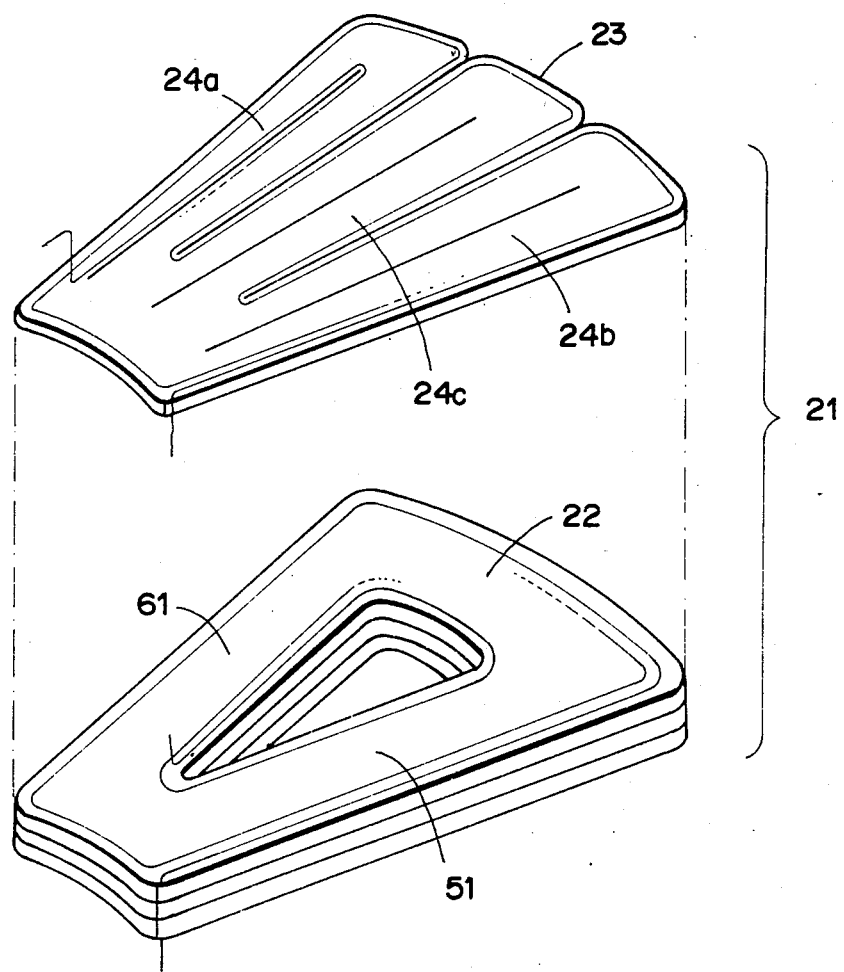
FIG. 4 is a diagrammatic view of another arrangement of the coils.

The DC motor shown partially and diagrammatically in the drawing comprises a stator formed of at least one disk 1, shown diagrammatically in FIG. 1, of an insulating material supporting twelve coils 2 distributed circumferentially at a given angular pitch about the center 3 of disk 1 on one of its faces. As may be seen in FIG. 1, each coil 2 is of trapezoidal shape, with a small base 4, two activer conductor portions 5 and 6 extending radially toward the periphery of disk 1, and a large base 7, the constitution of which will be described below. The design details of one of the coils 2 are shown in FIG. 2. It will be seen that these coils are formed, according to the printed circuit technique, of conductor paths separated from one another on the surface of disk 1. The coil thus includes the two active conductor portions 5 and 6 which extend radially and cover a sector of a circle having an aperture of 30°, i.e., at an angular pitch of 30°. These active conductors at respective ends thereof are connected by lateral connecting along small conductor portions arcuate base 4 and along large arcuate base 7 so as to form turns deposited one beside the other in spirals. The two ends of the continuous path forming each coil 2 are connected at eyelets 8 and 9 printed on support 1. An electronic circuit known per se, which may be mounted on the back of support 1, will act like the commutator of DC motors of conventional design. It will have two inputs connected to the two terminals of a current source, between which a constant DC voltage prevails. The commutation of the various coils may be controlled, for example, by a Hall detector known per se.

As may be seen in FIG. 2, the an auxiliary conductor portion which join the outer ends of portions 5 and 6 along the periphery of stator 1 are printed strips similar to those forming the active conductors, but the connections corresponding to the successive turns do not all have the same appearance. The connections joining the closest of the active conductors, i.e., those nearest eyelet 9, follow an arc of a circle centered on axis 3. For the connections of the outer turns, on the other hand, there is a zigzag arrangement comprising, starting from the outer end of the active conductors belonging to one or the other of the portions 5 and 6, a first arcuate peripheral section 7a, followed by a conductor section 7b disposed radially, i.e., with the same orientation relative to axis 3 as that of active conductor portions 5 and 6, and extending toward axis 3 for a certain distance, then, starting from the inner end of this radial section, a new arcuate peripheral section 7c centered on axis 3, a new radial auxiliary conductor portion 7d directed this time toward the outside, and a second outer peripheral section 7e which is symmetrical relative to the central axis of the coil, the following section reproducing symmetrically the form of radial auxiliary conductor portions 7d and 7b, as well as of outer and inner peripheral sections 7a and 7c. As may be seen in the drawing, each conductor surrounds the one disposed in the inwardly adjacent position, and the whole forms a segment of connections with an undulating appearance resembling an ornamental fret or meander design. As is apparent from FIGS. 1 and 2, each coil has the same number of turns with each turn comprising two active conductor portions 5, 6 with an arcuate connection conductor 4 connecting corresponding first ends of the active conductor portions. A first group of turns in each coil has an arcuate connecting conductor 7 connecting second ends of respective active conductor portions 5, 6. A second group of turns in each coil has connecting conductors 7, including auxiliary conductor portions 7b, 7d, connecting second ends of respective active conductor portions 5, 6. The coils have a substantially trapezoidal shape with active conductor portions 5 and 6 forming the sides of the trapezoid and with connecting conductors 4 and 7 forming the bases of the trapezoid. The auxiliary conductor portions 7b, 7d are formed in the connecting conductor 7 which is located farthest from axis 3. Thus, if the outer ends of the active conductors 5 and 6 are taken into account, the portion of outer connections of coil 2 comprises three pairs of segmentary portions auxiliary conductor portions 7b, 7d of radial conductors which are joined in series with active conductors 5 and 6 and extend radially over a fraction of the total length of conductors 5 and 6. In other words, in FIG. 2, portions 7b and 7d, along with the ends of active conductor portions 5 and 6, form three pairs of auxiliary conductor portions electrically connected in series with the active conductor portions 5 and 6 of coil 2. It should be noted that any odd-number of pairs of auxiliary conductors, greater than one, can be used to accomplish the above-mentioned "flattening" of the sinusoidal torque curve. As is evident from FIGS. 1 and 2, the angular pitch of the pairs of auxiliary conductors is one-third of the angular pitch of the active conductors 5 and 6. As a general proposition, the angular pitch of the pairs of auxiliary conductors will be a fraction of the angular pitch of the active conductors, the fraction being determined by dividing the angular pitch of the active conductors by the odd-number of pairs of auxiliary conductors.

Figure 6:
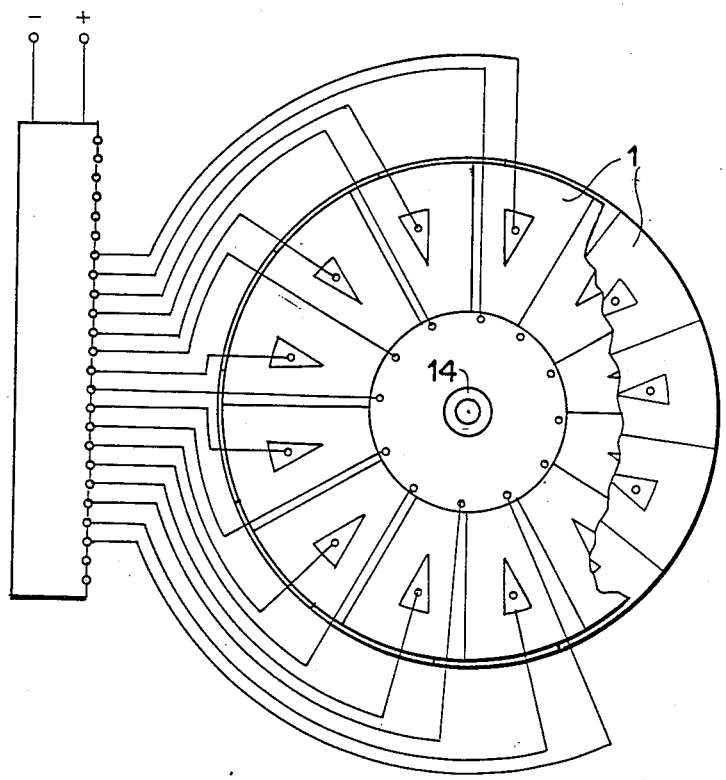
FIG. 6 is diagramic perspective view of two disks offset by 90 electrical degrees.

The stator is formed, for instance, with the aid of two parallel, coaxial disks 1 shifted by 90 electrical degrees (see FIG. 6). The stator thus described will co-operate with a rotor shown diagrammatically in FIG. 3 and made up of an assembly 11 of permanent magnets 10 in the shape of sectors of a circle having an aperture equal to that occupied by a portion of active conductors. The rotor shown in FIG. 3 may be formed of a thin disk of high-remanence ferromagnetic material magnetized axially, so that for each north or south pole visible in FIG. 3, there is a corresponding south or north pole on the opposite face of the disk. The rotor will comprise a shaft (not shown) supported by fixed bearings 14 (see FIGS. 2 and 6) and mounted coaxially on disks 1. The number of pairs of poles formed by the successive magnets 10 of the assembly 11 corresponds to the number of coils 2, i.e., twelve. As described up to now, the rotor illustrated in FIG. 3 could operate together with the stator of FIGS. 1 and 2. However, FIG. 3 shows a modification of the rotor in which the peripheral parts of the various magnets 10 have undergone a magnetization operation such that each of these peripheral parts is divided into three zones, the magnetization of the center zone 12 being the same as the main magnetization of the magnet, whereas that of the two end zones 13 is opposite.

The effects of the arrangement described are as follows: as the stator comprises twelve coils, the feed device constituted by the electronic circuit connected to the poles of the DC source will have to cause twenty-four commutations of the end of the coils per revolution of the rotor, i.e., two commutations per pair of poles for each of the two disks 1 shifted by 90 electrical degrees, so that the undulation of the torque, in a normal arrangement of the coils, would equal $1-\cos \pi/4$. In other words, the feed control device controls commutations of connections between the individual coils and the DC source as the rotor rotates, at commutation angles corresponding to the angular pitch of the coils.

However, the radial auxiliary conductor sections 7b, 7d and the ends of conductors 5 and 6 form three pairs of auxiliary conductor portions which, upon rotation of the rotor bearing permanent magnets 10, 12, and 13, are the seat of an induced voltage, the frequency of which is equal to three times the frequency of the commutations. As a result, the variation of the motor torque as a function of the angle of rotation of the rotor will have a much flatter curvature than it would without the undulations formed at the peripheral part of the coils.

As concerns the subdivision of the permanent magnetic poles of magnets 10 at their periphery, it has been found that although this arrangement enhances the effect obtained by means of the undulations of the peripheral parts of the coils, it is not absolutely indispensable, and the torque-flattening effect would exist even without these subdivisions, i.e., if the pairs of magnets forming the rotor had a fixed permanent magnetization from their inner ends to their outer ends.

It goes without saying that in the arrangement shown in the drawing, instead of coils 2 formed by conductors printed on an insulating substrate, air-core coils formed by a small number of layers of turns of fine wire might equally well be used, these turns being amalgamated to one another according to a well-known technique and glued, for example, to a support such as substrate 1.

However, in the case where wire is used to constitute the air-core coils, it has been found simpler from the manufacturing standpoint to produce the auxiliary conductor portion intended to flatten the torque curve by proceeding as shown in FIG. 4: the first trapezoidal turns 22 constituting coils 21 are wound according to the outline of FIG. 4, with arcuate outer peripheral connections, thus without undulations, so as to constitute the main part of the coil with the radial active conductor portions 51 and 61. After having thus wound three layers of side-by-side turns, for example, a last layer of turns 23 superposed on the first three is formed, but disposing in each turn the sections of auxiliary conductors so that they extend radially and form three pairs of auxiliary portions 24a, 24b, and 24c disposed side by side and extending over the whole radial length of the coil, on the one hand, and over the whole width of the coil, on the other hand. There is thus obtained a multiplication by three of the frequency of the voltage induced in the auxiliary conductor portions when the motor rotates, without its being necessary to subdivide the flux of the magnets by reversing the peripheral end parts of the fluxes.

Instead of having three pairs of auxiliary conductor portions, it would naturally be possible to provide five or seven or any other odd number greater than one instead. However, it has been found that with three pairs of auxiliary conductor portions, which represents the maximum simplification for forming the coils, the required flattening effect for the motor torque is already obtained.

The arrangement described may, of course, also be used in other DC motor designs, as well as in generators, e.g., DC tacho-generators. Thus, firstly, instead of the winding being fixed and the support of the magnetic fields rotatable, the opposite arrangement might be chosen, utilizing exactly the same arrangement of coils as in FIGS. 1 and 2. In that case, the ends of the coils would be connected to the segments of a commutator against which the brushes connected to the poles of the DC source would rest. The ring of permanent magnets 10 would then form the stator of the motor.

Figure 5:
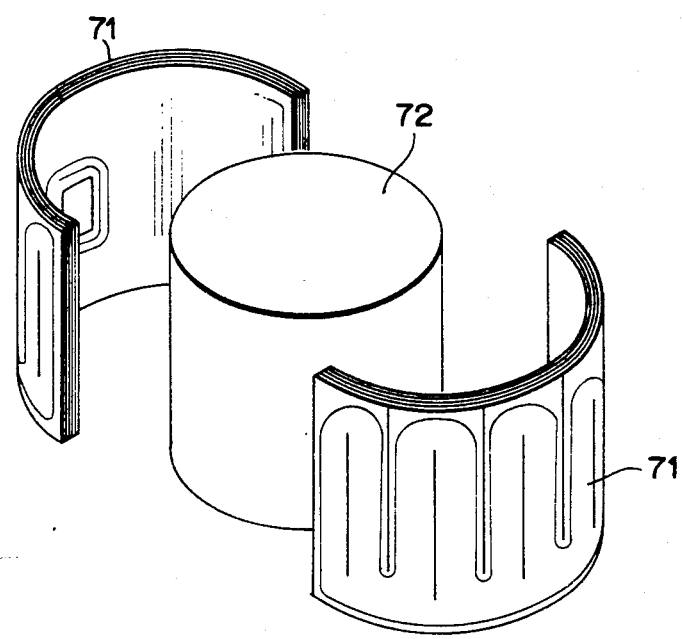
FIG. 5 is a diagrammatic perspective view of another arrangement of the motor.

The same arrangement of conductor portions may likewise be provided for in the case of FIG. 5, where the coils 71 are rectangular and, instead of being flat, are curved along cylinder-segment surfaces centered on the rotor 72. In this case, the magnetic fluxes created by the magnets are oriented radially, the magnets being disposed either within the coils or outside and around them. In the motor of FIG. 5, active conductor portions as well as auxiliary conductor portions of coil 71 each are oriented parallel with the axis of rotor 72. In both cases, either arrangement is possible, i.e., with the support of the permanent magnetic fluxes constituting the rotor and the winding support being the stator, or conversely, with the support of the magnetic fluxes constituting the stator and the winding support the rotor.

Finally, in the case where the coils are thin, curved windings in the shape of cylindrical surface segments, provision may also be made for the outline of the active conductors to be no more than a generatrix of the cylinder, i.e., a straight line, but for the coils to be curved in a spiral shaped.

What is claimed is:

1. An electric motor comprising an axis, a fixed part and a movable part rotatably mounted around said axis, wherein one of said parts comprises a winding including a number of coils distributed about said axis, each coil comprising two assemblies of active conductor portions spaced circumferentially at a given angular pitch, said motor further comprising feed control means connected to first and second poles of a constant-voltage current source for controlling commutations of connections between said active conductor portions and said poles at commutation angles corresponding to said angular pitch, wherein each coil comprises an odd number of pairs of auxiliary conductor portions electrically connected in series with the active conductor portions of the coil, each auxiliary conductor portion having an orientation relative to said axis similar to that of respective active conductor portions of the coil, said pairs of auxiliary conductors being distributed in each coil with an angular pitch which is the angular pitch of said active conductor portions divided by said odd number, said odd number being greater than one.

2. The electric motor of claim 1, wherein each coil has the same number of turns with each turn comprising two active conductor portions and an arcuate connecting conductor connecting respective first ends of said active conductor portions, a first group of said turns having an arcuate connecting conductor connecting second ends of respective active conductor portions, and a second group of said turns having connecting conductors, including said auxiliary conductor portions, connecting second ends of respective active conductor portions.

3. The electric motor of claim 1, wherein said coils have a substantially trapezoidal shape, said auxiliary conductor portions being formed in said connecting conductors located farthest from said axis.

4. The electric motor of claim 3, wherein said coils are constituted of conductive paths printed on a substrate said auxiliary conductor portions being constituted by undulations of said auxiliary conductor portions joining the ends of said active conductor portions.

5. The electric motor of claim 4, wherein the extent of said undulations in the direction of the orientation of said active conductor portions represents a fraction of the total length of said active conductor portions.

* * * * *